(No Model.)
C. E. CAMPBELL.
POT LIFTER.
No. 583,012. Patented May 18, 1897.
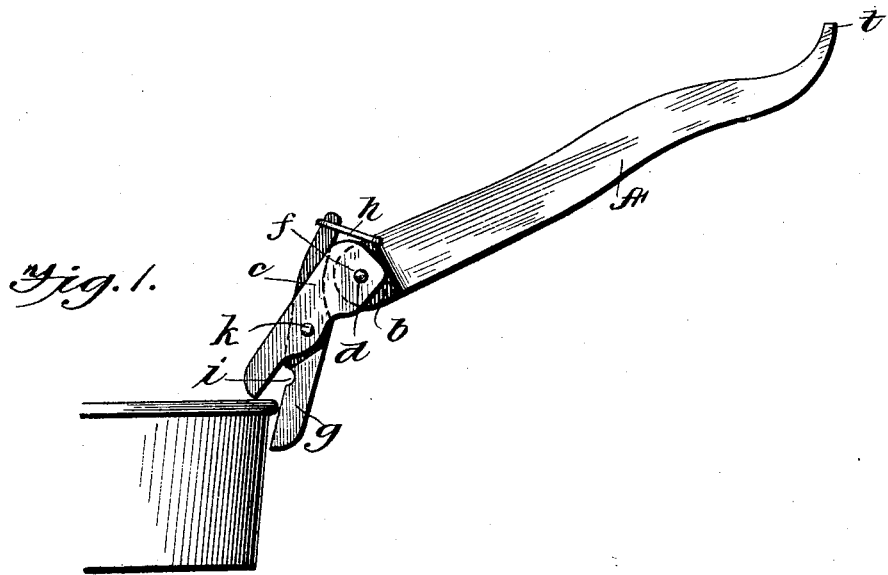
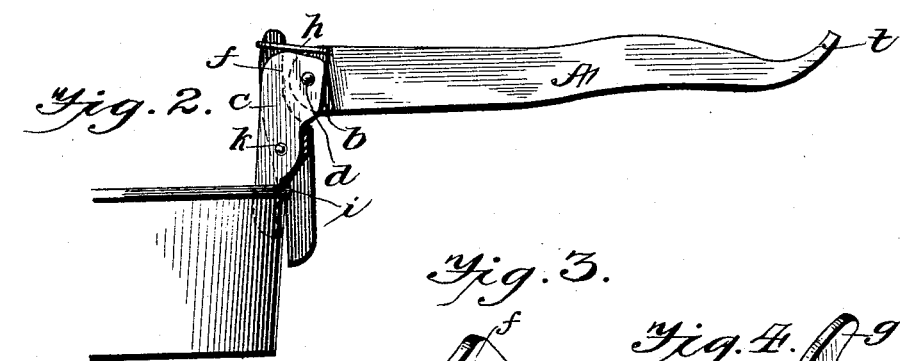
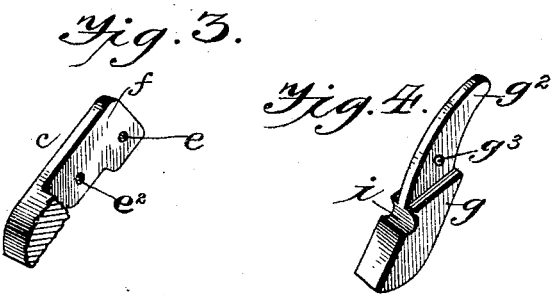
Witnesses
C. E. Hunt,
F. M. Wright.
Inventor
Charles E. Campbell
By T. J. Geisler
Attorney
THE NORRIS PETERS CO., PHOTO-LITHO., WASHINGTON, D. C.

UNITED STATES PATENT OFFICE.

CHARLES E. CAMPBELL, OF PORTLAND, OREGON, ASSIGNOR OF ONE-THIRD TO ALBERT J. CODY, OF SAME PLACE.

POT-LIFTER.

SPECIFICATION forming part of Letters Patent No. 583,012, dated May 18, 1897.

Application filed August 15, 1896. Serial No. 602,910. (No model.)

*To all whom it may concern:*

Be it known that I, CHARLES E. CAMPBELL, of Portland, county of Multnomah, and State of Oregon, have invented a new and useful Pot-Lifter, of which the following is a specification, reference being had to the accompanying drawings as a part hereof.

The object of my invention is to obtain a lifter with which handleless pots and other utensils may be safely lifted.

The construction of my invention is apparent in the accompanying drawings, the figures in which represent as follows:

Figure 1 is a complete view of my invention, showing the same as applied to a pot for lifting the same. Fig. 2 shows my invention lifting a pot, and Figs. 3 and 4 are details of construction.

The letters designate the parts referred to. My invention comprises a shank A, provided at its base with a perforated tongue $b$, onto which the bifurcated upper jaw $c$ (a partial perspective of which is shown in Fig. 3) is pivotally attached by means of a rivet $d$, passing through the perforation $e$ in the lugs $f$ (only one of which can be seen) of such upper jaw. The lower jaw $g$, which coöperates with the upper jaw, is constructed as shown in Fig. 4, having a tongue $g^2$, in which is a perforation $g^3$, the tongue $g^2$ being inserted between the lugs $f$ of the upper jaw, and the parts connected by a rivet or pin $k$, inserted through the said perforation $g^3$ and the perforations $e^2$ in the lugs $f$. The loop $h$ is inserted in a perforation therefor provided in the upper part of the tongue $b$ on the shank or handle $a$, and the free end of such loop $h$ is thrown over and engages the upper end of the projecting tongue $g^2$ of the lower jaw $g$. The face of the lower jaw is provided with a groove $i$, in which to receive the rim of the vessel to be lifted.

When using my invention, the same is applied to the utensil as shown in Fig. 1. By raising the shank or handle of the lifter toward a vertical position the jaws will open, and may then be inserted over the rim of the vessel to be lifted, whereupon the handle is brought to a horizontal position, the handle being held and the utensil lifted therewith as if such handle were rigidly attached thereto; and it will be found that the greater the weight of the utensil and its contents lifted the firmer will be the grip of my invention, so that there is no possible danger of slipping.

The upper or outer end of my invention may be provided with a tongue $t$ to adapt the same for lifting stove-covers.

I claim as follows:

1. In a pot-lifter, the combination of the shank A, the upper jaw $c$ pivotally suspended therefrom, the lower jaw $g$ pivoted to said upper jaw at a point below the pivot of the latter on the shank, said lower jaw having a tongue $g^2$ extending above the upper jaw, said jaws thereby crossing each other at their pivotal point, and a link arranged to connect said shank with said upwardly-extending tongue, whereby the downward pivotal movement of the shank acts to draw down the tongue $g^2$, and so bring the working faces of the jaws together, substantially as described.

2. In a pot-lifter, the combination of the shank A, the upper jaw $c$ pivotally suspended therefrom, the lower jaw $g$ pivoted to said upper jaw at a point below the pivot of the latter on the shank, said lower jaw having a transverse groove adapted to grasp the rim of a pot and also having a tongue $g^2$ extending above the upper jaw, said jaws thereby crossing each other at their pivotal point, and a link arranged to connect said shank with said upwardly-extending tongue, whereby the downward pivotal movement of the shank acts to draw down the tongue $g^2$, and so bring together the working faces of the jaws, substantially as described.

In testimony whereof I have hereunto set my hand, this 19th day of May, 1896, in the presence of two witnesses.

CHARLES E. CAMPBELL.

Witnesses:
T. J. GEISLER,
E. D. TIMMS.